US012491714B2

(12) United States Patent
Yamasaki et al.

(10) Patent No.: US 12,491,714 B2
(45) Date of Patent: Dec. 9, 2025

(54) LIQUID EJECTING HEAD AND LIQUID EJECTING APPARATUS

(71) Applicant: SEIKO EPSON CORPORATION, Tokyo (JP)

(72) Inventors: Sosuke Yamasaki, Shiojiri (JP); Shohei Mizuta, Matsumoto (JP); Yoichi Naganuma, Matsumoto (JP); Yuma Fukuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 313 days.

(21) Appl. No.: 18/185,170

(22) Filed: Mar. 16, 2023

(65) Prior Publication Data

US 2023/0294401 A1 Sep. 21, 2023

(30) Foreign Application Priority Data

Mar. 17, 2022 (JP) ................................ 2022-042233

(51) Int. Cl.
*B41J 2/14* (2006.01)

(52) U.S. Cl.
CPC ................................ *B41J 2/14201* (2013.01)

(58) Field of Classification Search
None
See application file for complete search history.

(56) References Cited

U.S. PATENT DOCUMENTS

2009/0195606 A1* 8/2009 Hirasawa ............... B41J 2/1623 347/47
2014/0253627 A1* 9/2014 Nakao .................. B41J 2/14233 347/19
2018/0009218 A1* 1/2018 Tamura ................ B41J 2/04541

FOREIGN PATENT DOCUMENTS

JP 2008-149617 A 7/2008
KR 100512957 B1 * 9/2005

OTHER PUBLICATIONS

Kim Yun Gi, Machine TranslationofKR-100512957B1, 2004 (Year: 2004).*

* cited by examiner

*Primary Examiner* — Scott A Richmond
(74) *Attorney, Agent, or Firm* — WORKMAN NYDEGGER

(57) ABSTRACT

A liquid ejecting head includes a pressure chamber substrate having a pressure chamber, a drive element, a communication substrate having a supply communication flow path communicating with the pressure chamber and a nozzle communication flow path communicating with the pressure chamber and communicating with a nozzle for ejecting a liquid at a position different from the supply communication flow path, and a coupling substrate disposed between the pressure chamber substrate and the communication substrate, the coupling substrate having a supply port located between the pressure chamber and the supply communication flow path and a discharge port located between the pressure chamber and the nozzle communication flow path, in which a flow path cross-sectional area of the supply port is smaller than a flow path cross-sectional area of the supply communication flow path, and the coupling substrate is made of a photosensitive resist film.

15 Claims, 6 Drawing Sheets

LIQUID EJECTING HEAD AND LIQUID EJECTING APPARATUS

The present application is based on, and claims priority from JP Application Serial Number 2022-042233, filed Mar. 17, 2022, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting apparatus typified by an ink jet printer generally includes a liquid ejecting head that ejects a liquid such as ink. For example, JP-A-2008-149617 describes a head having a configuration in which a pressure chamber plate, a communication port plate, a supply port plate, and a reservoir plate are laminated and bonded in this order. Here, the pressure chamber plate partitions a pressure chamber. A third communication port and a supply-side communication port are formed on the communication port plate. A supply port and a second communication port are formed on the supply port plate. A reservoir and a first communication port are formed on the reservoir plate. The third communication port communicates with the pressure chamber, and functions as a nozzle communication port communicating with a nozzle in a series of the first communication port and the second communication port. The supply-side communication port communicates with the pressure chamber, and functions as an ink supply port that supplies ink from the reservoir to the pressure chamber together with the supply port.

In the head described in JP-A-2008-149617, since each plate is bonded by an adhesive, the adhesive may enter the flow path and cause ejection failure. Here, since an opening area of the supply port is extremely small, there is a high possibility that the supply port is blocked by the adhesive.

SUMMARY

According to an aspect of the present disclosure, there is provided a liquid ejecting head including: a pressure chamber substrate having a pressure chamber for accommodating a liquid; a drive element that imparts a pressure fluctuation to the liquid in the pressure chamber; a communication substrate having a supply communication flow path communicating with the pressure chamber and a nozzle communication flow path communicating with the pressure chamber and communicating with a nozzle for ejecting a liquid at a position different from the supply communication flow path; and a coupling substrate disposed between the pressure chamber substrate and the communication substrate, the coupling substrate having a supply port located between the pressure chamber and the supply communication flow path and a discharge port located between the pressure chamber and the nozzle communication flow path, in which a flow path cross-sectional area of the supply port is smaller than a flow path cross-sectional area of the supply communication flow path, and the coupling substrate is made of a photosensitive resist film.

According to another aspect of the present disclosure, there is provided a liquid ejecting apparatus including: the above-described liquid ejecting head; and a liquid container storing a liquid supplied to the liquid ejecting head.

DESCRIPTION OF EXEMPLARY EMBODIMENTS

Figure 1:
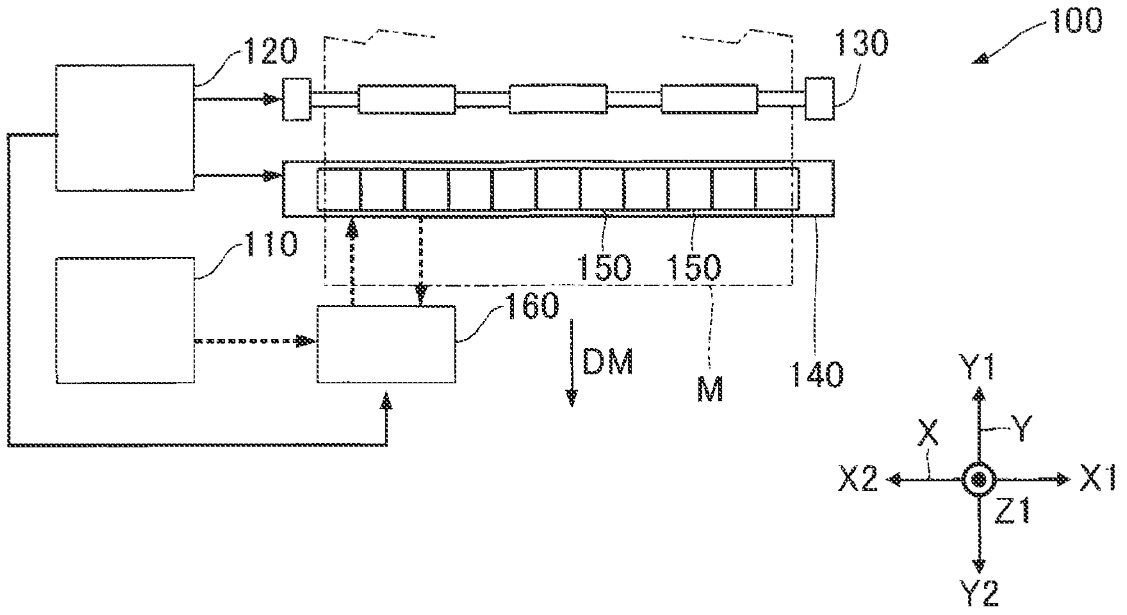
FIG. 1 is a schematic diagram illustrating a configuration example of a liquid ejecting apparatus according to a first embodiment.

Hereinafter, preferred embodiments according to the present disclosure will be described with reference to accompanying drawings. In the drawings, the dimensions and scale of each section are appropriately different from the actual ones, and some sections are schematically illustrated for facilitating understanding. In addition, the scope of the present disclosure is not limited to these forms unless it is stated in the following description that the present disclosure is particularly limited.

The following description will be given appropriately using X axis, Y axis and Z axis that intersect each other for convenience. Further, one direction along the X axis is an X1 direction, and a direction opposite to the X1 direction is an X2 direction. In a similar manner, directions opposite to each other along the Y axis are a Y1 direction and a Y2 direction. Further, directions opposite to each other along the Z axis are a Z1 direction and a Z2 direction.

Here, typically, the Z axis is a vertical axis, and the Z2 direction corresponds to a downward direction in the vertical direction. Here, the Z axis does not have to be a vertical axis and may be inclined with respect to the vertical axis. The X axis, the Y axis, and the Z axis are typically orthogonal to each other, but are not limited to this, and may intersect at an angle within a range of, for example, 80° or more and 100° or less. In the following, viewing in the direction along the Z axis may be referred to as "plan view".

1. First Embodiment

1-1. Liquid Ejecting Apparatus

FIG. 1 is a schematic diagram illustrating a configuration example of a liquid ejecting apparatus 100 according to a first embodiment. The liquid ejecting apparatus 100 is an ink jet printing apparatus that ejects ink, which is an example of a liquid, as droplets onto a medium M. The liquid ejecting apparatus 100 of the present embodiment is a so-called line-type printing apparatus in which a plurality of nozzles for ejecting ink are distributed throughout the entire range in a width direction of the medium M. The medium M is typically a printing paper. The medium M is not limited to the printing paper, and may be, for example, a printing target of any material such as a resin film or cloth.

As illustrated in FIG. 1, the liquid ejecting apparatus 100 includes a liquid container 110, a control unit 120, a transport mechanism 130, a liquid ejecting module 140, and a circulation mechanism 160. Here, the liquid ejecting module 140 includes a plurality of liquid ejecting heads 150.

The liquid container 110 is a container for storing an ink. Specific embodiments of the liquid container 110 include, for example, a cartridge that is attachable to and detachable from the liquid ejecting apparatus 100, a bag-shaped ink package made of a flexible film, and an ink tank that can be refilled with the ink. The type of the ink stored in the liquid container 110 is optional.

Although not illustrated in the drawing, the liquid container 110 of the present embodiment includes a first liquid container and a second liquid container. The first liquid container stores a first ink. The second liquid container stores a second ink having a type different from that of the first ink. For example, the first ink and the second ink are inks with different colors from each other. The first ink and the second ink may be the same type of ink.

The control unit 120 controls an operation of each element of the liquid ejecting apparatus 100. The control unit 120 includes, for example, one or a plurality of processing circuits such as a central processing unit (CPU) or a field programmable gate array (FPGA) and one or a plurality of storage circuits such as a semiconductor memory. The storage circuit stores various programs and various data. The processing circuit realizes various controls by executing the programs and using the data as appropriate.

The transport mechanism 130 transports the medium M in a direction DM under control of the control unit 120. The direction DM of the present embodiment is the Y2 direction. In an example illustrated in FIG. 1, the transport mechanism 130 includes a long transport roller along the X axis and a motor that rotates the transport roller. The transport mechanism 130 is not limited to the configuration using the transport roller, and may be configured to use, for example, a drum or an endless belt that transports the medium M in a state where the medium M is attracted to an outer peripheral surface by electrostatic force or the like.

Under the control of the control unit 120, the liquid ejecting module 140 ejects the ink, which is supplied from the liquid container 110 through the circulation mechanism 160, from each of the plurality of nozzles to the medium M in the Z2 direction. The liquid ejecting module 140 is a line head having a plurality of liquid ejecting heads 150 disposed such that the plurality of nozzles are distributed throughout the entire range of the medium M in the direction of the X axis. The plurality of liquid ejecting heads 150 are collectively supported by a support (not illustrated), and a positional relationship between the plurality of liquid ejecting heads 150 is fixed.

An image of ink is formed on the surface of the medium M by ejecting the ink from the plurality of liquid ejecting heads 150 in parallel with the transport of the medium M by the transport mechanism 130. It should be noted that the plurality of nozzles of one liquid ejecting head 150 may be disposed so as to be distributed throughout the entire range of the medium M in the direction along the X axis. In such a case, for example, the liquid ejecting module 140 is constituted of one liquid ejecting head 150. The number of liquid ejecting heads 150 included in the liquid ejecting module 140 is not limited to the example illustrated in FIG. 1, and is optional.

The liquid container 110 is coupled to the liquid ejecting module 140 through the circulation mechanism 160. The circulation mechanism 160 supplies the ink to the liquid ejecting module 140 under the control of the control unit 120, and recovers the ink discharged from the liquid ejecting module 140 in order to resupply the ink to the liquid ejecting module 140. The circulation mechanism 160 has, for example, a sub tank that stores the ink, a supply flow path for supplying the ink from the sub tank to the liquid ejecting module 140, a recovery flow path for recovering the ink from the liquid ejecting module to the sub tank, and a pump for appropriately flowing the ink. The sub tank, the supply flow path, the recovery flow path, and the pump are provided for each container of the above-mentioned first liquid container and second liquid container. By the operation of the circulation mechanism 160 as described above, it is possible to suppress an increase in viscosity of the ink and reduce retention of air bubbles in the ink.

1-2. Liquid Ejecting Head

Figure 2:
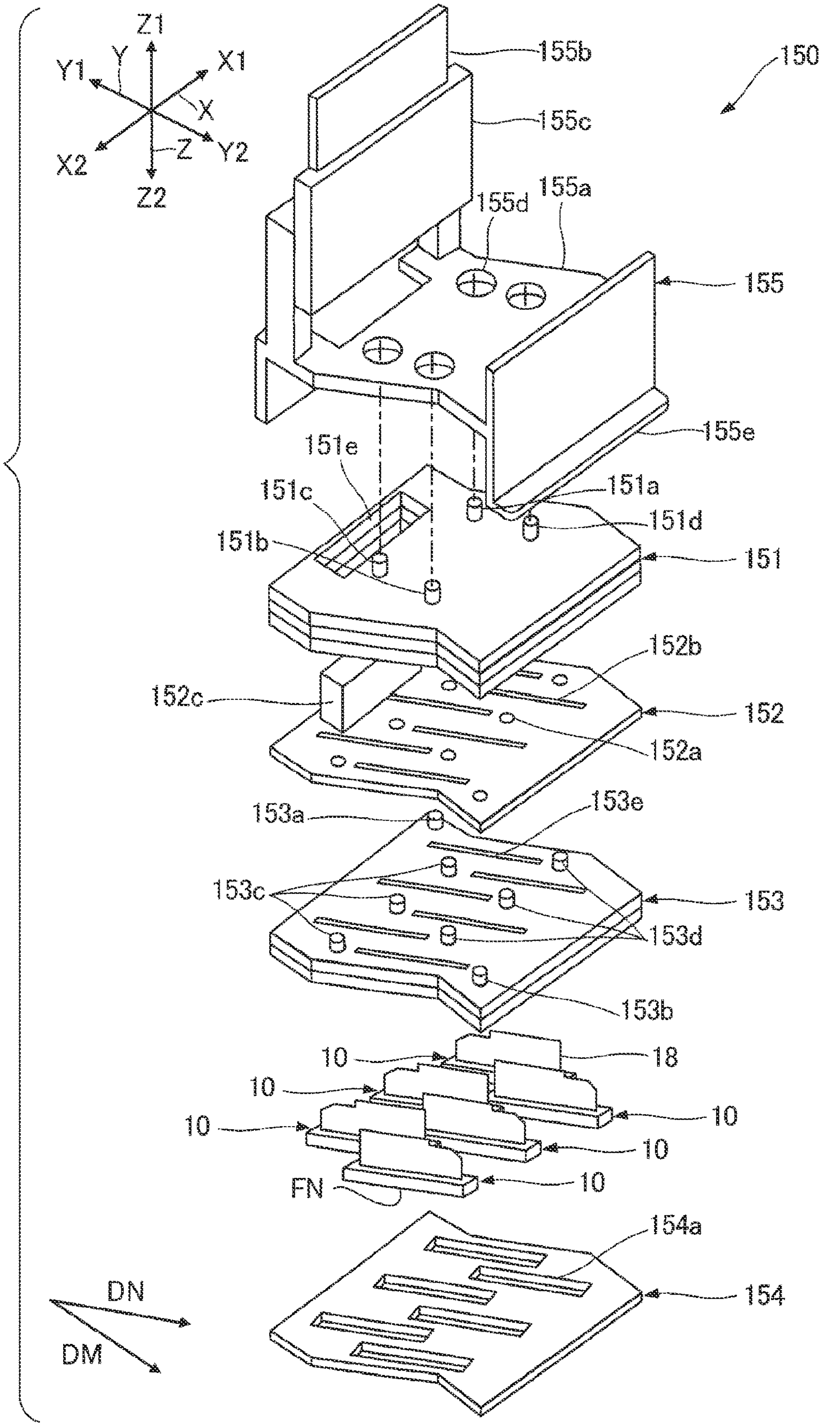
FIG. 2 is an exploded perspective view of a liquid ejecting head according to a first embodiment.

FIG. 2 is an exploded perspective view of the liquid ejecting head 150 according to the first embodiment. As illustrated in FIG. 2, the liquid ejecting head 150 includes a flow path structure 151, a wiring substrate 152, a holder 153, a plurality of head chips 10, a fixing plate 154, and a base 155. These are disposed in the order of the base 155, the flow path structure 151, the wiring substrate 152, the holder 153, the plurality of head chips 10, and the fixing plate 154 in the Z2 direction. Hereinafter, each section of the liquid ejecting head 150 will be described in sequence. Of the components illustrated in FIG. 2, the components other than the head chip 10 are not particularly limited, and may be provided as needed and may be omitted or changed as appropriate.

The flow path structure 151 is a structure in which a flow path for flowing the ink between the circulation mechanism 160 and the plurality of head chips 10 are provided inside the flow path structure 151. As illustrated in FIG. 2, the flow path structure 151 is provided with a coupling tube 151*a*, a coupling tube 151*b*, a coupling tube 151*c*, a coupling tube 151*d*, and a hole 151*e*.

Here, although not illustrated in FIG. 2, inside the flow path structure 151, there are provided flow paths such as a first supply flow path, a second supply flow path, a first discharge flow path, and a second discharge flow path. The first supply flow path is a flow path through which the first ink is supplied to the plurality of head chips 10. The second supply flow path is a flow path through which the second ink is supplied to the plurality of head chips 10. A filter for capturing foreign matter and the like is provided in the middle of each of the supply flow paths. The first discharge flow path is a flow path through which the first ink is discharged from the plurality of head chips 10. The second discharge flow path is a flow path through which the second ink is discharged from the plurality of head chips 10.

Each of the coupling tubes 151*a*, 151*b*, 151*c*, and 151*d* is a tubular body protruding in the Z1 direction and is coupled to the circulation mechanism 160. The coupling tube 151*a* is a tubular body constituting a flow path through which the first ink is supplied to first supply flow path. The coupling tube 151*b* is a tubular body constituting a flow path through which the second ink is supplied to the second supply flow path. Meanwhile, the coupling tube 151*c* is a tubular body constituting a flow path through which the first ink is discharged from the first discharge flow path. The coupling tube 151*d* is a tubular body constituting a flow path through which the second ink is discharged from the second discharge flow path. The hole 151*e* is a hole into which a connector 152*c* to be described later is inserted.

The wiring substrate 152 is a mount component that electrically couples the plurality of head chips 10 and an assembly substrate 155*b* to be described later. The wiring substrate 152 is, for example, a rigid wiring substrate. The wiring substrate 152 is disposed between the flow path structure 151 and the holder 153. The connector 152*c* is provided on a surface of the wiring substrate 152 facing the flow path structure 151. The connector 152*c* is a coupling component coupled to the assembly substrate 155*b* to be described later. The wiring substrate 152 is provided with a plurality of holes 152*a* and a plurality of opening portions 152*b*. Each hole 152*a* is a hole for causing coupling between the flow path structure 151 and the holder 153. Each opening portion 152*b* is a hole through which a wiring substrate 18 of the head chip 10 described later is passed. The wiring substrate 18 is coupled to a surface of the wiring substrate 152 facing the Z1 direction.

The holder 153 is a structure that accommodates and supports the plurality of head chips 10. The holder 153 is made of, for example, a resin material, a metal material, or the like. The holder 153 has a plate shape which extends in a direction perpendicular to the Z axis. The holder 153 is provided with a coupling tube 153*a*, a coupling tube 153*b*, a plurality of coupling tubes 153*c*, a plurality of coupling tubes 153*d*, and a plurality of wiring holes 153*e*. Although not illustrated, a plurality of recess portions for accommodating the plurality of head chips 10 are provided on the surface of the holder 153 facing the Z2 direction.

In the example illustrated in FIG. 2, the holder 153 holds six head chips 10. These head chips 10 are arranged in the X2 direction so as to be alternately displaced in the direction along the Y axis. However, the head chips 10 have portions that overlap each other when viewed in the X1 direction or the X2 direction. The arrangement direction DN of a plurality of nozzles N to be described later in the head chips 10 is parallel to each other. Each of the head chips 10 is disposed such that the arrangement direction DN is inclined with respect to the direction DM which is the transport direction of the medium M.

Here, although not illustrated in FIG. 2, inside the holder 153, there are provided a first distribution supply flow path, a second distribution supply flow path, a plurality of first individual discharge flow paths, a plurality of second individual discharge flow paths, and a plurality of bypass flow paths. The first distribution supply flow path is a flow path having a branch through which the first ink is supplied to the plurality of head chips 10. The second distribution supply flow path is a flow path having a branch through which the second ink is supplied to the plurality of head chips 10. The first individual discharge flow path is provided for each head chip 10 that discharges the first ink, and is a flow path through which the first ink discharged from the head chip 10 is introduced into the first discharge flow path of the flow path structure 151. The second individual discharge flow path is provided for each head chip 10 that discharges the second ink, and is a flow path through which the second ink discharged from the head chip 10 is introduced into the second discharge flow path of the flow path structure 151. The two bypass flow paths are provided for each head chip 10, and are bypass flow paths for communicating a common liquid chamber R1 and a common liquid chamber R2 to be described later. The bypass flow path may be provided as needed and may be removed.

In the example illustrated in FIG. 2, the first ink is supplied to three head chips 10 out of the six head chips 10, and the second ink is supplied to the remaining three head chips 10.

The coupling tubes 153*a*, 153*b*, 153*c*, and 153*d* are tubular protrusions protruding in the Z1 direction. More specifically, the coupling tube 153*a* is a tubular body constituting a flow path through which the first ink is supplied to the first distribution supply flow path, and communicates with the first supply flow path of the flow path structure 151. The coupling tube 153*b* is a tubular body constituting a flow path through which the second ink is supplied to the second distribution supply flow path, and communicates with the second supply flow path of the flow path structure 151. Meanwhile, the coupling tube 153*c* is a tubular body constituting a flow path through which the first ink is discharged from the first individual discharge flow path, and communicates with the first discharge flow path of the flow path structure 151. The coupling tube 153*d* is a tubular body constituting a flow path through which the second ink is discharged from the second individual discharge flow path, and communicates with the second discharge flow path of the flow path structure 151. The wiring hole 153*e* is a hole through which the wiring substrate 18 of the head chip 10 is passed.

Each head chip 10 ejects an ink. Although not illustrated in FIG. 2, each head chip 10 has a plurality of nozzles for ejecting the first ink and a plurality of nozzles for ejecting the second ink. The nozzles are provided on a nozzle surface FN, which is a surface of each head chip 10 facing the Z2 direction. Details of the head chip 10 will be described with reference to FIG. 3 to be described later.

The fixing plate 154 is a plate member which fixes the plurality of head chips 10 to the holder 153.

Specifically, the fixing plate 154 is disposed with the plurality of head chips 10 sandwiched between the fixing plate 154 and the holder 153, and is fixed to the holder 153 with an adhesive. The fixing plate 154 is made of, for example, a metal material. The fixing plate 154 is provided with a plurality of opening portions 154*a* for exposing the nozzles of the plurality of head chips 10. In the example illustrated in FIG. 2, the plurality of opening portions 154*a* are individually provided for each head chip 10. Two or more head chips 10 may share the opening portions 154*a*.

The base 155 is a member for collectively holding the flow path structure 151, the wiring substrate 152, the holder 153, the plurality of head chips 10, and the fixing plate 154. The base 155 has a main body 155*a*, an assembly substrate 155*b*, and a cover 155*c*.

The main body 155*a* holds the flow path structure 151 and the wiring substrate 152 disposed between the base 155 and the holder 153 by being fixed to the holder 153 through screwing or the like. The main body 155*a* is made of, for example, a resin material or the like. The main body 155*a* has a plate-shaped portion facing the plate-shaped portion of the flow path structure 151 described above, and the plate-shaped portion is provided with a plurality of holes 155*d* into which the coupling tubes 151*a*, 151*b*, 151*c*, and 151*d* described above are inserted. The main body 155*a* has a portion extending in the Z2 direction from the plate-shaped portion, and a flange 155*e* for fixing to a support (not illustrated) is provided at the tip of the portion.

The assembly substrate 155*b* is a mount component that electrically couples the control unit 120 and the wiring substrate 152 described above. The assembly substrate 155*b* is, for example, a rigid wiring substrate. The cover 155*c* is a plate-shaped member which protects the assembly substrate 155*b* and fixes the assembly substrate 155*b* to the main body 155*a*. The cover 155*c* is made of, for example, a resin material or the like, and is fixed to the main body 155*a* through screwing or the like.

1-3. Head Chip

Figure 3:
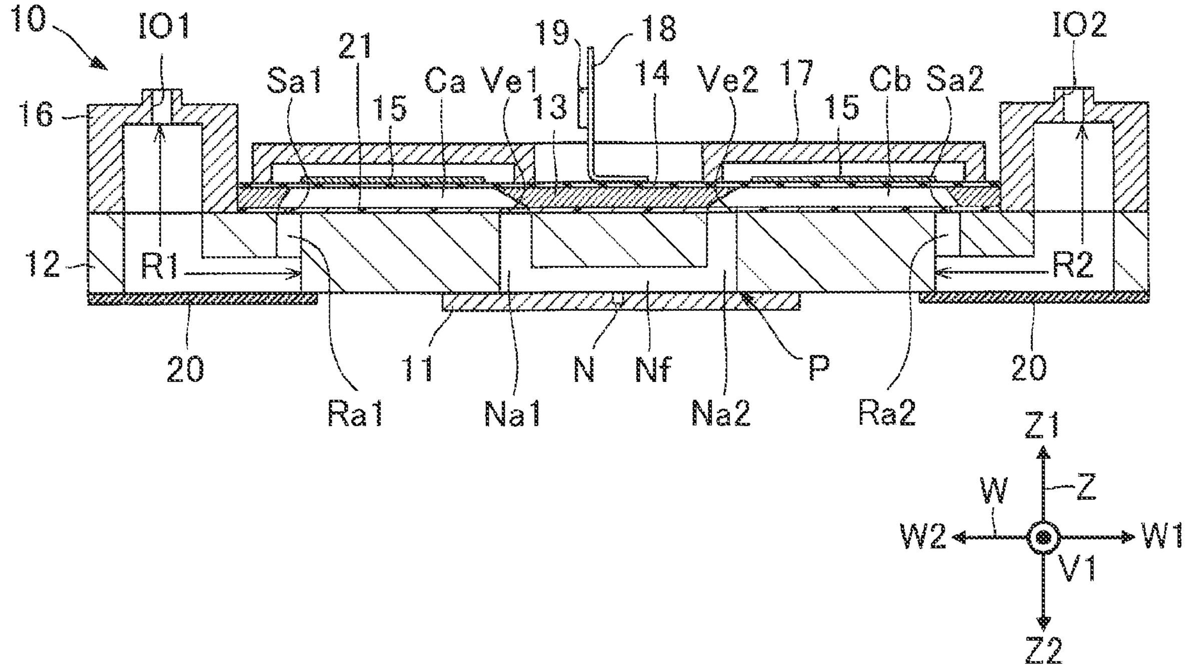
FIG. 3 is a cross-sectional view of a head chip of the liquid ejecting head according to the first embodiment.
Figure 5:
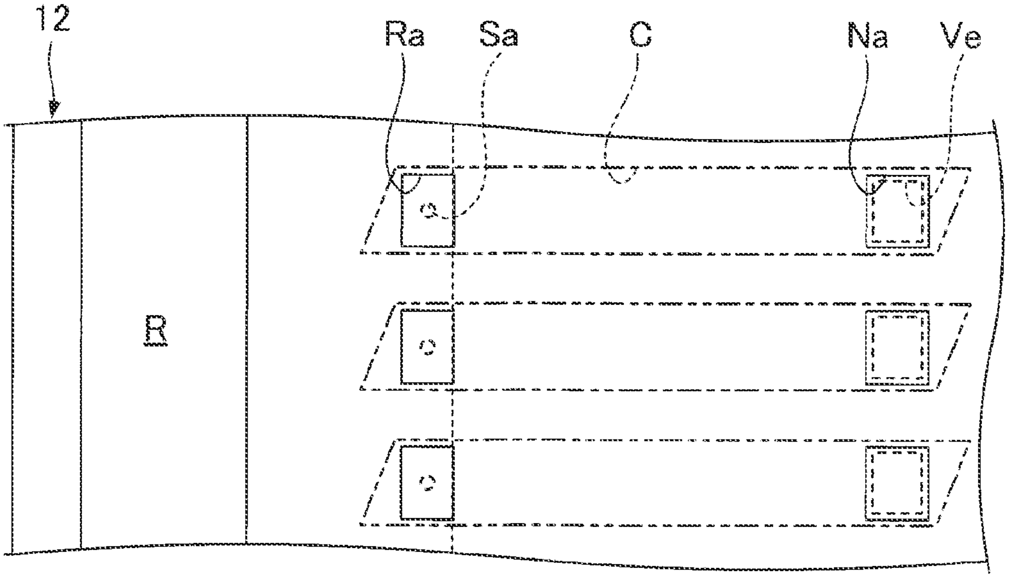
FIG. 5 is a plan view of a communication substrate.

FIG. 3 is a cross-sectional view of the head chip 10 of the liquid ejecting head 150 according to the first embodiment. The following description will be given appropriately using a V axis and a W axis in addition to the X axis, the Y axis, and the Z axis for convenience. One direction along the V axis is a V1 direction, and a direction opposite to the V1 direction is a V2 direction. In a similar manner, directions opposite to each other along the W axis are the W1 direction and the W2 direction. FIG. 5 illustrates a cross section of the head chip 10 which is cut in a plane including the W axis and the Z axis.

Here, the V axis is an axis along an arrangement direction of the plurality of nozzles N to be described later, and is an axis which is obtained by rotating the Y axis around the Z axis at a predetermined angle. The W axis is an axis which is obtained by rotating the X axis around the Z axis at the predetermined angle. Therefore, the V axis and the W axis are typically orthogonal to each other, but are not limited to this, and may intersect at an angle within a range of, for example, 80° or more and 100° or less. The predetermined angle, that is, the angle which is formed by the V axis and the Y axis, or the angle which is formed by the W axis and the X axis is, for example, within the range of 40° or more and 60° or less.

First, a flow path provided in the head chip 10 will be described. As illustrated in FIG. 3, the head chip 10 is provided with the plurality of nozzles N, a plurality of individual flow paths P, the common liquid chamber R1, and the common liquid chamber R2. Here, the common liquid chamber R1 and the common liquid chamber R2 communicate with each other through the plurality of individual flow paths P.

The head chip 10 has a surface facing the medium M, and the plurality of nozzles N are provided on the surface. The plurality of nozzles N are arranged along the V axis. Each of the plurality of nozzles N ejects the ink in the Z2 direction. Here, the plurality of nozzles N are arranged at equal intervals at a predetermined pitch.

The individual flow path P communicates with each of the plurality of nozzles N. Each of the plurality of individual flow paths P extends along the W axis and communicates with the nozzles N different from each other. The plurality of individual flow paths P are arranged along the V axis.

Each individual flow path P includes a pressure chamber Ca, a pressure chamber Cb, a nozzle flow path Nf, a supply communication flow path Ra1, a supply communication flow path Ra2, a nozzle communication flow path Na1, a nozzle communication flow path Na2, supply ports Sa1 and Sa2, and discharge ports Ve1 and Ve2.

Each of the pressure chamber Ca and the pressure chamber Cb in each individual flow path P extends along the W axis and is a space in which the ink ejected from the nozzle N communicating with the individual flow path P is stored. In an example illustrated in FIG. 3, the plurality of pressure chambers Ca are arranged along the V axis. In a similar manner, the plurality of pressure chambers Cb are arranged along the V axis. In each individual flow path P, positions of the pressure chamber Ca and the pressure chamber Cb in the direction along the V axis are the same in the example illustrated in FIG. 4, but may be different from each other. In the following, when the pressure chamber Ca and the pressure chamber Cb are not particularly distinguished, each pressure chamber may be referred to as "pressure chamber C".

In each individual flow path P, the pressure chamber Ca communicates with the nozzle flow path Nf via the discharge port Ve1 and the nozzle communication flow path Na1. Meanwhile, the pressure chamber Cb communicates with the nozzle flow path Nf via the discharge port Ve2 and the nozzle communication flow path Na2. In the following, when the nozzle communication flow path Na1 and the nozzle communication flow path Na2 are not particularly distinguished, each of these may be referred to as a "nozzle communication flow path Na". Further, when the discharge port Ve1 and the discharge port Ve2 are not particularly distinguished, each of these may be referred to as a "discharge port Ve".

In each individual flow path P, the nozzle flow path Nf is a space which extends along the W axis. The plurality of nozzle flow paths Nf are arranged along the V axis at intervals from each other. The nozzle N is provided in each nozzle flow path Nf. In each nozzle flow path Nf, the ink is ejected from the nozzle N by changing the pressure in the pressure chamber Ca and the pressure chamber Cb described above.

The common liquid chamber R1 and the common liquid chamber R2 communicate with the plurality of individual flow paths P. Here, the pressure chamber Ca communicates with the common liquid chamber R1 via the supply port Sa1 and the supply communication flow path Ra1. The pressure chamber Cb communicates with the common liquid chamber R2 via the supply port Sa2 and the supply communication flow path Ra2. In the following, when the supply communication flow path Ra1 and the supply communication flow path Ra2 are not particularly distinguished, each of these may be referred to as a "supply communication flow path Ra". Further, when the supply port Sa1 and the supply port Sa2 are not particularly distinguished, each of these may be referred to as a "supply port Sa".

Each of the common liquid chamber R1 and the common liquid chamber R2 is a space which extends along the V axis throughout the entire range in which the plurality of nozzles N are distributed. Here, the common liquid chamber R1 is coupled to an end of each individual flow path P in the W2 direction. The common liquid chamber R1 stores the ink for supplying to each individual flow path P.

Meanwhile, the common liquid chamber R2 is coupled to an end of each individual flow path P in the W1 direction. The common liquid chamber R2 stores the ink discharged from each individual flow path P without being ejected.

The common liquid chamber R1 is provided with a supply port IO1. The supply port IO1 is a tube path for introducing ink into the common liquid chamber R1 from the first distribution supply flow path or the second distribution supply flow path of the holder 153. Meanwhile, the common liquid chamber R2 is provided with a discharge port 102. The discharge port 102 is a tube path for discharging ink from the common liquid chamber R2 to the first individual discharge flow path or the second individual discharge flow path of the holder 153. In the following, when the common liquid chamber R1 and the common liquid chamber R2 are not particularly distinguished, each of these may be referred to as a "common liquid chamber R".

As illustrated in FIG. 3, the head chip 10 having the above flow paths includes a nozzle substrate 11, a communication substrate 12, a pressure chamber substrate 13, a vibration plate 14, a plurality of drive elements 15, a case 16, a protective plate 17, a wiring substrate 18, a drive circuit 19, a vibration absorbing body 20, and a coupling substrate 21.

The nozzle substrate 11, the communication substrate 12, the coupling substrate 21, the pressure chamber substrate 13, and the vibration plate 14 are laminated in this order in the Z1 direction. Each of the members extends along the V axis and is manufactured, for example, by processing a silicon single crystal substrate using a semiconductor processing technique. The members are bonded to each other by an adhesive or the like. It should be noted that another layer such as an adhesive layer or a substrate may be appropriately interposed between two adjacent members among the members.

The plurality of nozzles N are provided on the nozzle substrate 11. Each of the plurality of nozzles N is a hole that penetrates the nozzle substrate 11.

The communication substrate 12 is provided with a portion of each of the common liquid chamber R1 and the common liquid chamber R2, the nozzle flow path Nf, the nozzle communication flow path Na1, the nozzle communication flow path Na2, the supply communication flow path Ra1, and the supply communication flow path Ra2. A portion of each of the common liquid chamber R1 and the common liquid chamber R2 is a space for penetrating the communication substrate 12. The vibration absorbing body 20 that blocks the opening by the space is provided on a surface of the communication substrate 12 facing the Z2 direction.

The vibration absorbing body 20 is a layered member made of an elastic material. The vibration absorbing body 20 constitutes a portion of the wall surface of each of the common liquid chamber R1 and the common liquid chamber R2, and absorbs the pressure fluctuation in the common liquid chamber R1 and the common liquid chamber R2.

The nozzle flow path Nf is a space in a groove provided on a surface of the communication substrate 12 facing the Z2 direction. Here, the nozzle substrate 11 constitutes a portion of the wall surface of the nozzle flow path Nf.

Each of the nozzle communication flow path Na1 and the nozzle communication flow path Na2 is a space that penetrates the communication substrate 12.

Each of the supply communication flow path Ra1 and the supply communication flow path Ra2 is a space that penetrates the communication substrate 12. Here, one end of the supply communication flow path Ra1 is opened on a surface of the communication substrate 12 facing the Z1 direction. Meanwhile, the other end of the supply communication flow path Ra1 is an upstream end of the individual flow path P in the direction in which the ink flows by the circulation mechanism 160, and is open on the wall surface of the common liquid chamber R1 in the communication substrate 12. On the other hand, one end of the supply communication flow path Ra2 is opened on the surface of the communication substrate 12 facing the Z1 direction. Meanwhile, the other end of the supply communication flow path Ra2 is an end on the downstream of the individual flow path P in the direction in which the ink flows by the circulation mechanism 160, and is open on the wall surface of the common liquid chamber R2 in the communication substrate 12.

The pressure chamber substrate 13 is provided with the pressure chambers Ca and the pressure chambers Cb of the plurality of individual flow paths P. Each of the pressure chamber Ca and the pressure chamber Cb penetrates the pressure chamber substrate 13 and is a gap between the communication substrate 12 and the vibration plate 14.

Here, the coupling substrate 21 is interposed between the pressure chamber substrate 13 and the communication substrate 12. The coupling substrate 21 is provided with holes for the supply ports Sa1 and Sa2 and the discharge ports Ve1 and Ve2 to penetrate in the thickness direction. The coupling substrate 21 and related matters will be described in detail later with reference to FIG. 4.

The vibration plate 14 is a plate-shaped member which is able to elastically vibrate. The vibration plate 14 is a laminate including, for example, a first layer made of silicon oxide ($SiO_2$) and a second layer made of zirconium oxide ($ZrO_2$). Here, another layer such as a metal oxide may be interposed between the first layer and the second layer. A portion or all of the vibration plate 14 may be integrally made of the same material as the pressure chamber substrate 13. For example, the vibration plate 14 and the pressure chamber substrate 13 can be integrally formed by selectively removing a portion in the thickness direction of the region corresponding to the pressure chamber C in the plate-shaped member having a predetermined thickness. The vibration plate 14 may be constituted of a layer of a single material.

The plurality of drive elements 15 corresponding to different pressure chambers C are installed on a surface of the vibration plate 14 facing the Z1 direction. Each drive element 15 is a piezoelectric element, and is, for example, configured by laminating a first electrode and a second electrode facing each other and a piezoelectric layer disposed between the electrodes. Each drive element 15 ejects the ink in the pressure chamber C from the nozzle N by changing the pressure of the ink in the pressure chamber C. The drive element 15 vibrates the vibration plate 14 due to deformation thereof when a driving signal Com is supplied. With the vibration, the pressure chamber C expands and contracts. Therefore, the pressure of the ink in the pressure chamber C fluctuates. The drive element 15 may be a heat generating element that changes the pressure of the ink by generating air bubbles inside the pressure chamber C by heat.

The case 16 is a case that stores the ink. The case 16 is provided with a space constituting a remaining portion other than a portion provided on the communication substrate 12 for each of the common liquid chamber R1 and the common liquid chamber R2.

The protective plate 17 is a plate-shaped member provided on the surface of the vibration plate 14 facing the Z1 direction, protects the plurality of drive elements 15, and reinforces mechanical strength of the vibration plate 14. Here, a space for accommodating the plurality of drive elements 15 is formed between the protective plate 17 and the vibration plate 14.

The wiring substrate 18 is mounted on the surface of the vibration plate 14 facing the Z1 direction, and is a mount component that electrically couples the control unit 120 and the head chip 10. For example, it is preferable that a flexible wiring substrate 18 such as a flexible printed circuit (FPC) or a flexible flat cable (FFC) is used. The drive circuit 19 described above is mounted on the wiring substrate 18.

In the head chip 10 having the above configuration, the ink is distributed to the common liquid chamber R1, the supply communication flow path Ra1, the supply port Sa1, the pressure chamber Ca, the discharge port Ve1, the nozzle communication flow path Na1, the nozzle flow path Nf, the nozzle communication flow path Na2, the discharge port Ve2, the pressure chamber Cb, the supply port Sa2, the supply communication flow path Ra2, and the common liquid chamber R2 in the order by the operation of the circulation mechanism 160 described above.

The pressures of the pressure chamber Ca and the pressure chamber Cb are changed by simultaneously driving the drive element 15 corresponding to both the pressure chamber Ca and the pressure chamber Cb by the driving signal Com from the drive circuit 19. Thereby, the ink is ejected from the nozzle N in accordance with the pressure fluctuation thereof.

1-4. Coupling Substrate

Figure 4:
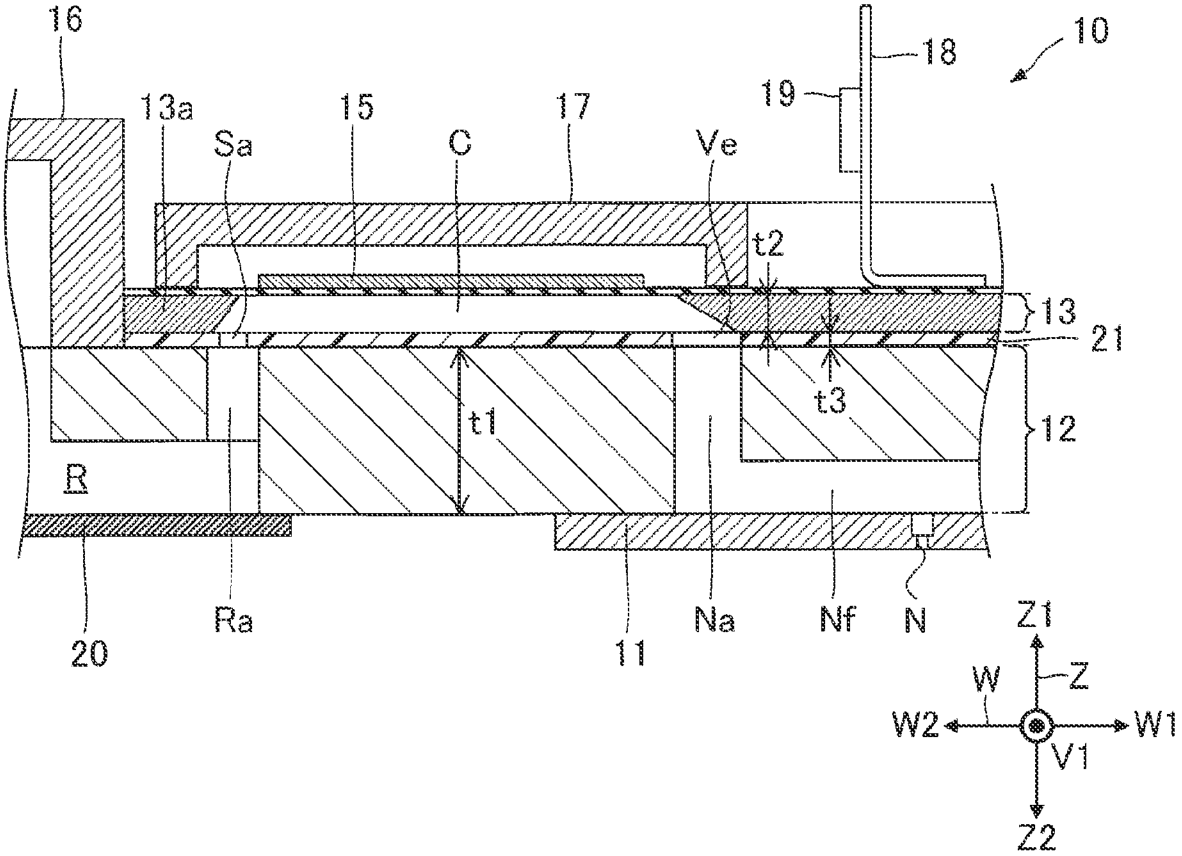
FIG. 4 is a partially enlarged cross-sectional view of the head chip illustrated in FIG. 2.

FIG. 4 is a partially enlarged cross-sectional view of the head chip 10 illustrated in FIG. 2. FIG. 5 is a plan view of the communication substrate 12. As illustrated in FIGS. 4 and 5, the coupling substrate 21 is interposed between the communication substrate 12 and the pressure chamber substrate 13. As described above, the coupling substrate 21 is provided with the supply port Sa and the discharge port Ve. Each of the supply port Sa and the discharge port Ve is a hole that penetrates the coupling substrate 21.

As illustrated in FIG. 5, the supply port Sa overlaps both the opening of the supply communication flow path Ra and the pressure chamber C in a plan view. Then, the pressure chamber C communicates with the supply communication flow path Ra via the supply port Sa. Meanwhile, the discharge port Ve overlaps both the opening of the nozzle communication flow path Na and the pressure chamber C in a plan view. Then, the pressure chamber C communicates with the nozzle communication flow path Na via the discharge port Ve.

An opening area of the supply port Sa is smaller than an opening area of the discharge port Ve. Therefore, since a flow path resistance of the supply port Sa is higher than a flow path resistance of the discharge port Ve, the ink in the pressure chamber C is more likely to flow into the discharge port Ve than the supply port Sa. As a result, the ink can be efficiently ejected from the nozzle N by the pressure fluctuation of the ink in the pressure chamber C caused by driving the drive element 15.

Here, from the viewpoint of efficiently ejecting ink from the nozzle N, preferably, a width of the supply port Sa is within a range of 0.1 times or more and 0.5 times or less with respect to a width of the discharge port Ve. Specifically, the width of the supply port Sa is in the range of 5 μm or more and 50 μm or less, preferably in the range of 10 μm or more and 40 μm or less, and these dimensions may be adjusted according to the viscosity of the ink and the like.

In the example illustrated in FIG. 5, a plan view shape of the supply port Sa is circular, and a plan view shape of the discharge port Ve is rectangular. Here, a plan view shape of the opening of each of the nozzle communication flow path Na and the supply communication flow path Ra is rectangular. Therefore, the plan view shapes of the opening of the supply communication flow path Ra and the supply port Sa are different from each other. Meanwhile, the plan view shapes of the opening of the nozzle communication flow path Na and the discharge port Ve are coincident or similar to each other. The plan view shapes are not limited to the example illustrated in FIG. 5, and are optional. For example, when the communication substrate 12 is processed by anisotropic etching, the plan view shape of the opening of each of the nozzle communication flow path Na and the supply communication flow path Ra is a parallel quadrilateral.

Further, while the opening area of the discharge port Ve is about the same as the opening area of the nozzle communication flow path Na, the opening area of the supply port Sa is smaller than the opening area of the supply communication flow path Ra. Therefore, compared to a configuration in which the opening area of the supply communication flow path Ra is set to about the same as the opening area of the supply port Sa, it is possible to simplify the processing of the communication substrate 12 at the time of manufacturing. That is, when the opening area of the supply communication flow path Ra is formed to be small, more accurate pilot hole drilling is required, but this is not necessary and processing at low cost becomes possible.

Further, a thickness t3 of the coupling substrate 21 is thinner than each of a thickness t1 of the communication substrate 12 and a thickness t2 of the pressure chamber substrate 13. Therefore, the supply port Sa and the discharge port Ve can be provided on the coupling substrate 21 with high accuracy. As a result, it is possible to reduce variations in the ejection characteristics of the liquid ejecting head 150 for each nozzle N. The ejection characteristics are general terms for volume and velocity of the droplets ejected from the nozzle N, a timing at which the droplets ejected from the nozzle N, and the like when a pressure fluctuation is imparted to the ink in the pressure chamber C by driving the drive element 15. Here, from the viewpoint of improving the dimensional accuracy of the supply port Sa and the discharge port Ve, the thickness t3 is preferably 10 μm or more and 50 μm or less.

The coupling substrate 21 is made of a photosensitive resist film. The photosensitive resist film is a film made of a photoresist material, and is generally also referred to as a "dry film", a "photosensitive film", or the like. The photosensitive film used for the coupling substrate 21 may be either a positive type or a negative type, but a negative type is preferably used. The material of the photosensitive resist film used for the coupling substrate 21 is not particularly limited, but is preferably made of an epoxy-based resin from the viewpoint of liquid resistance to ink, adhesive strength, and the like.

When the coupling substrate 21 is made of a photosensitive resist film, regardless of the constituent materials of the communication substrate 12 and the pressure chamber substrate 13, the coupling substrate 21 can be bonded to both or one of the communication substrate 12 and the pressure chamber substrate 13 by an adhesive force of the photosensitive resist film without using a coating type adhesive. Therefore, it is possible to eliminate both the adhesive between the communication substrate 12 and the coupling substrate 21 and the adhesive between the coupling substrate 21 and the pressure chamber substrate 13, or one of the adhesives, and it is possible to prevent the adverse effect of blocking the supply port Sa and the like with the adhesive.

In order to form the coupling substrate 21 using the photosensitive resist film, for example, a photosensitive resist film before exposure adheres to one of the communication substrate 12 and the pressure chamber substrate 13, and then the supply port Sa and the discharge port Ve are formed by exposure and development. Thereafter, by adhering the other of the communication substrate 12 and the pressure chamber substrate 13 to the photosensitive resist film, a laminate is obtained in which the coupling substrate 21 and the pressure chamber substrate 13 are bonded to each other through the coupling substrate 21 in a semi-cured state. Then, by heat-treating the laminate, the coupling substrate 21 is completely cured, and the communication substrate 12 and the pressure chamber substrate 13 are bonded to the coupling substrate 21.

Here, the pressure chamber substrate 13 bonded to the surface of the coupling substrate 21 facing the Z1 direction has a partition wall 13*a* that partitions the pressure chamber C. The partition wall 13*a* is a portion of the pressure chamber substrate 13 that surrounds the pressure chamber C in a plan view and covers the entire area of the pressure chamber substrate 13 in the thickness direction. A surface of the partition wall 13*a* facing the Z2 direction is coupled to the coupling substrate 21.

Meanwhile, the communication substrate 12 bonded to the surface of the coupling substrate 21 facing the Z2 direction is bonded to the coupling substrate 21 over a wide area in a circumferential direction of the supply port Sa in the vicinity of the supply port Sa. Therefore, when the pressure chamber substrate 13 is bonded to the coupling substrate 21, deformation of the coupling substrate 21 can be reduced due to a load at the time of bonding. Therefore, it is possible to reduce the deterioration of the ejection characteristics due to the deformation.

As described above, the liquid ejecting head 150 includes the pressure chamber substrate 13, the drive element 15, the communication substrate 12, and the coupling substrate 21. The pressure chamber substrate 13 has the pressure chamber C for accommodating ink, which is an example of a "liquid". The drive element 15 imparts a pressure fluctuation to the ink in the pressure chamber C. The communication substrate 12 has the supply communication flow path Ra communicating with the pressure chamber C and the nozzle communication flow path Na that communicates with the pressure chamber C at a position different from the supply communication flow path Ra and also communicates with the nozzle N for ejecting ink. The coupling substrate 21 Is disposed between the pressure chamber substrate 13 and the communication substrate 12 in the direction along the Z axis, and has the supply port Sa located between the pressure chamber C and the supply communication flow path Ra in the direction along the Z axis and the discharge port Ve located between the pressure chamber C and the nozzle communication flow path Na in the direction along the Z axis.

Here, a flow path cross-sectional area of the supply port Sa is smaller than a flow path cross-sectional area of the supply communication flow path Ra. The coupling substrate 21 is made of a photosensitive resist film.

In the above liquid ejecting head 150, since the coupling substrate 21 is formed of a photosensitive resist film, the pressure chamber substrate 13 and the communication substrate 12 can be bonded to each other via the coupling substrate 21 without using a coating type adhesive. Therefore, it is possible to prevent an ejection failure caused by the coating type adhesive blocking the supply port Sa.

Here, as described above, the thickness t3 of the coupling substrate 21 is thinner than the thickness t2 of the pressure chamber substrate 13 or the thickness t1 of the communication substrate 12. As the thickness of the coupling substrate 21 is thinner, there is an advantage that the opening area of the supply port Sa can be easily reduced. Further, by reducing the opening area of the supply port Sa, the pressure applied to the ink in the pressure chamber C is hard to escape from the supply port Sa and is efficiently transmitted to the discharge port Ve.

Further, as described above, the photosensitive resist film used for the coupling substrate 21 is made of an epoxy-based resin, and thus, each of the supply port Sa and the discharge port Ve can be formed with high accuracy. In addition, strong adhesive force of the coupling substrate 21 to each of the pressure chamber substrate 13 and the communication substrate 12 can be expected.

2. Second Embodiment

Hereinafter, a second embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 6:
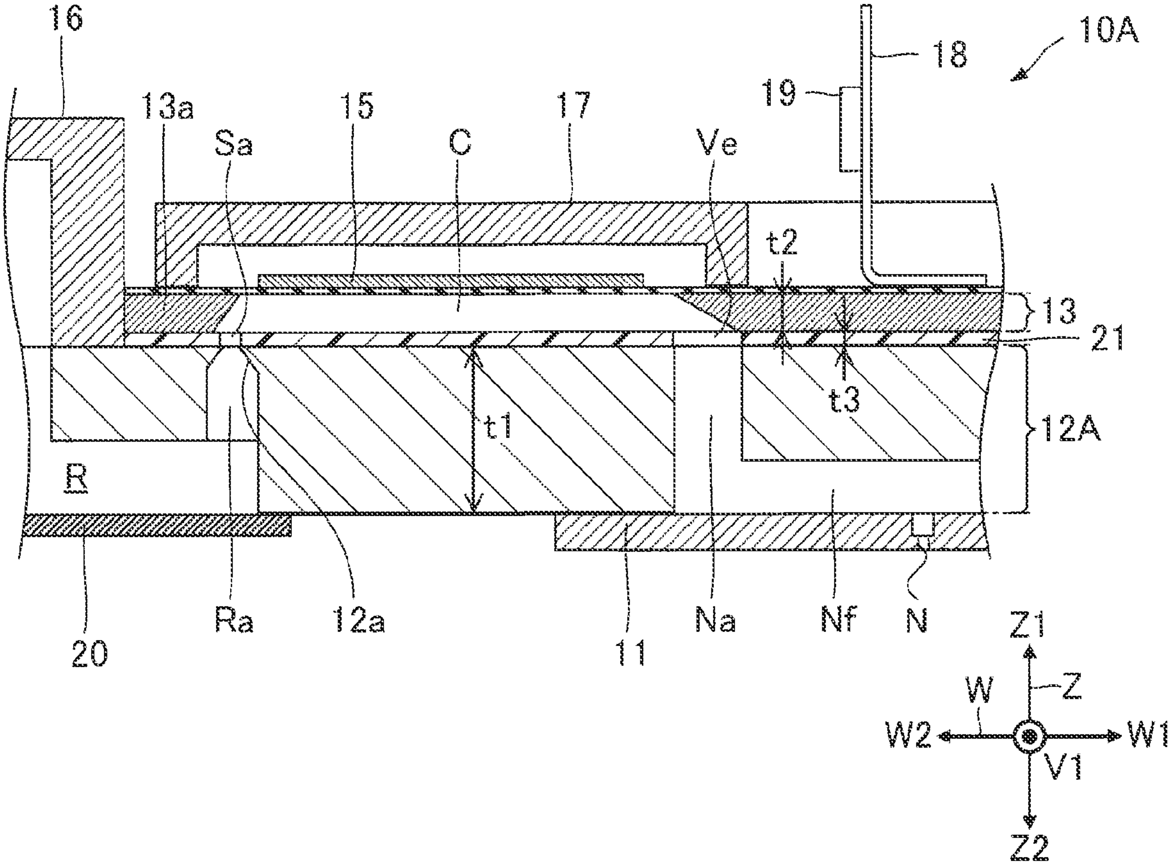
FIG. 6 is a partially enlarged cross-sectional view of a head chip of a liquid ejecting head according to a second embodiment.

FIG. 6 is a partially enlarged cross-sectional view of a head chip 10A of a liquid ejecting head according to the second embodiment. The head chip 10A has the same configuration as the head chip 10 of the first embodiment described above, except for including a communication substrate 12A instead of the communication substrate 12. The communication substrate 12A is configured in the same manner as the communication substrate 12 except that the shape of the supply communication flow path Ra is different.

The communication substrate 12A has a tapered portion 12*a* in which an inner wall surface of the supply communication flow path Ra is inclined toward the supply port Sa. As a result, the cross-sectional area of the supply communication flow path Ra becomes smaller toward the supply port Sa.

In the example illustrated in FIG. 6, the tapered portion 12*a* is formed of a flat surface. Here, when the communication substrate 12A is made of a silicon single crystal substrate, the flat surface can be formed by using the crystal plane of silicon. More specifically, anisotropic etching is performed after forming a pilot hole penetrating in a (110) silicon single crystal substrate in the depth direction of the supply communication flow path Ra by laser, dry etching, or the like, and thus, the tapered portion 12*a* having a (111) plane is obtained. The shape of the tapered portion 12*a* is not limited to the example illustrated in FIG. 6, and may be, for example, a stepped shape, a concave curved shape, or a convex curved shape. In addition, a method for forming the supply communication flow path Ra is not limited to the method using anisotropic etching, and any method can be used.

Also according to the second embodiment as described above, it is possible to reduce the deterioration of the ejection characteristics due to the deformation of the coupling substrate 21. In the present embodiment, as described above, the inner wall surface of the supply communication flow path Ra has the tapered portion 12*a* that is inclined toward the supply port Sa. Therefore, retention of air bubbles in the vicinity of the supply port Sa can be reduced, and deterioration or fluctuation of the ejection characteristics can be suppressed. In addition, the area of the portion where the coupling substrate 21 is disposed in a single layer can be reduced. As a result, even though the coupling substrate 21 is formed of a material having a low Young's modulus with respect to the pressure generated in the pressure chamber C, the coupling substrate 21 does not act as unintended compliance and can avoid deterioration of the ejection characteristics. Further, the reliability of the head chip 10 can be improved.

3. Third Embodiment

Hereinafter, a third embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 7:
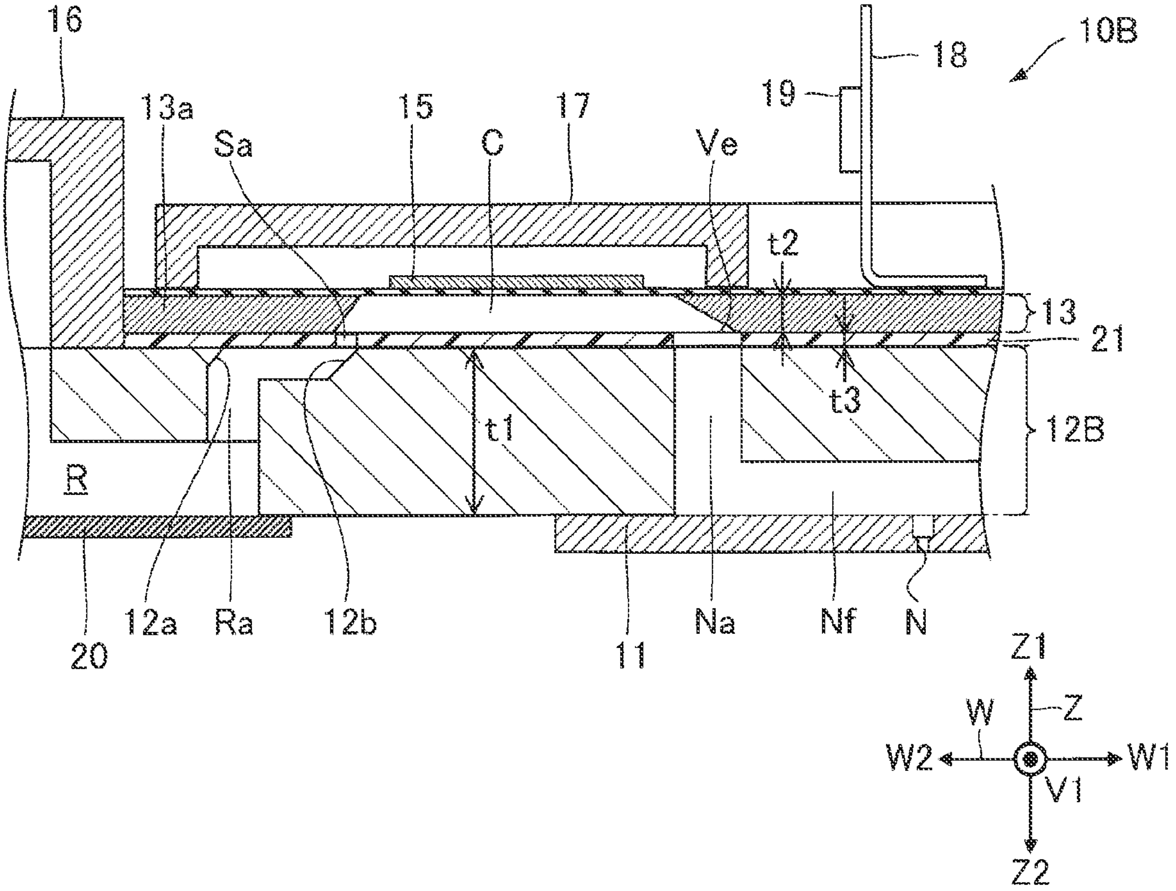
FIG. 7 is a partially enlarged cross-sectional view of a head chip of a liquid ejecting head according to a third embodiment.

FIG. 7 is a partially enlarged cross-sectional view of a head chip 10B of a liquid ejecting head according to the third embodiment. The head chip 10B has the same configuration as the head chip 10 of the first embodiment described above, except for including the communication substrate 12B instead of the communication substrate 12. The communication substrate 12B has the same configuration as the communication substrate 12 except that the shape of the supply communication flow path Ra is different.

In the communication substrate 12B, the end of the supply communication flow path Ra in the Z1 direction extends in the W1 direction toward the pressure chamber C, and near the end of the supply communication flow path Ra in the W1 direction, the supply communication flow path Ra and the pressure chambers C communicate with each other via the supply port Sa. Here, the inner wall surface of the supply communication flow path Ra has the tapered portion 12*b* that is inclined toward the supply port Sa.

Also according to the above-described third embodiment, it is possible to reduce the deterioration of the ejection characteristics due to the deformation of the coupling substrate 21.

4. Fourth Embodiment

Hereinafter, a fourth embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 8:
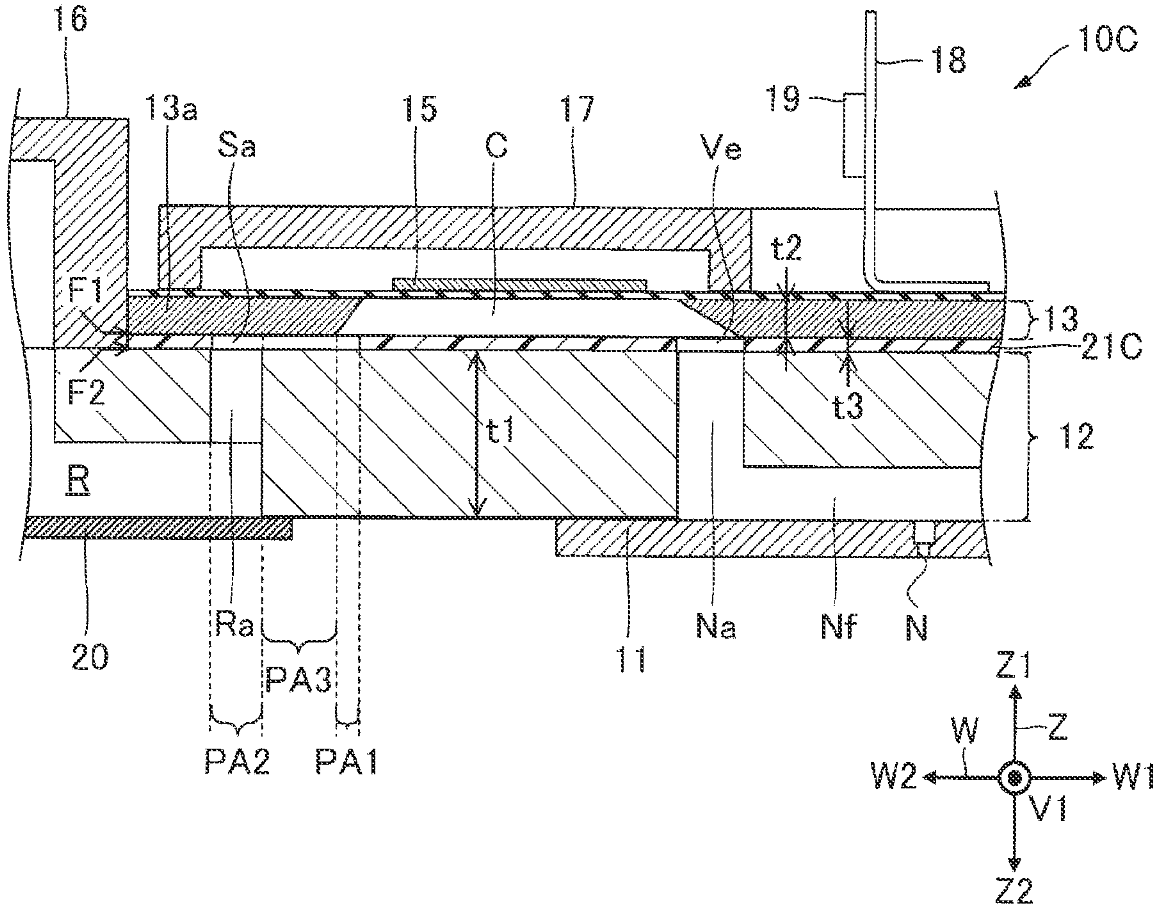
FIG. 8 is a partially enlarged cross-sectional view of a head chip of a liquid ejecting head according to a fourth embodiment.

FIG. 8 is a partially enlarged cross-sectional view of a head chip 10C of a liquid ejecting head according to the fourth embodiment. The head chip 10C has the same configuration as the head chip 10 of the first embodiment described above, except for including the coupling substrate 21C instead of the coupling substrate 21. However, the supply communication flow path Ra is disposed at a position that does not overlap the pressure chamber C in a plan view. The coupling substrate 21C is configured in the same manner as the coupling substrate 21 except that the opening areas of the supply ports Sa are different.

The coupling substrate 21C has a shape in which the supply port Sa extends from a position where the supply port Sa overlaps the supply communication flow path Ra in a plan view to a position where the supply port Sa overlaps the pressure chamber C. As a result, the supply communication flow path Ra and the pressure chamber C communicate with each other via the supply port Sa. More specifically, the supply communication flow path Ra and the pressure chamber C communicate with each other through a gap formed between the communication substrate 12 and the pressure chamber substrate 13 by the supply port Sa. Further, since a flow path cross-sectional area by the supply port Sa is defined by the thickness of the coupling substrate 21C, the flow path resistance of the supply port Sa can be made higher than the flow path resistance of the discharge port Ve.

Also according to the above-described fourth embodiment, it is possible to reduce the deterioration of the ejection characteristics due to the deformation of the coupling substrate 21C. In the present embodiment, as described above, the supply communication flow path Ra and the pressure chamber C communicate with each other through the gap formed between the communication substrate 12 and the pressure chamber substrate 13 by the supply port Sa, and thus, it is possible to eliminate the portion where the coupling substrate 21C exists in a single layer near the supply port Sa. Therefore, deterioration of the ejection characteristics due to the coupling substrate 21C is suitably prevented.

More specifically, the coupling substrate 21C has a first surface F1 and a second surface F2 facing a direction opposite to the first surface F1. The region of the first surface F1 not bonded to the pressure chamber substrate 13 and the region of the second surface F2 not bonded to the communication substrate 12 do not overlap each other when viewed in the thickness direction of the pressure chamber substrate 13. The rigidity of the photosensitive resist film is generally lower than the rigidity of a film material made of another material such as silicon or stainless steel. Therefore, the regions that are not bonded to either the communication substrate 12 or the pressure chamber substrate 13 of the coupling substrate 21C when viewed in the thickness direction of the pressure chamber substrate 13 do not overlap each other when viewed in the thickness direction of the pressure chamber substrate 13, and thus, it is possible to eliminate the portion of the coupling substrate 21C that exists as a single layer, thereby preventing damage or the like due to insufficient rigidity of the coupling substrate 21C. As a result, the reliability of the liquid ejecting head can be improved.

In the present embodiment, the supply port Sa has a first portion PA1, a second portion PA2, and a third portion PA3. The first portion PA1 does not overlap the supply communication flow path Ra but overlaps the pressure chamber C when viewed in the thickness direction of the pressure chamber substrate 13. The second portion PA2 does not overlap the pressure chamber C but overlaps the supply communication flow path Ra when viewed in the thickness direction of the pressure chamber substrate 13. The third portion PA3 is located between the first portion PA1 and the second portion PA2 when viewed in the thickness direction of the pressure chamber substrate 13, and does not overlap both the pressure chamber C and the supply communication flow path Ra. With such a first portion PA1, a second portion PA2, and a third portion PA3, it is possible to reduce the retention of air bubbles in the vicinity of the supply port Sa. In addition, the area of the portion where the coupling substrate 21C is disposed in a single layer can be reduced. As a result, the reliability of the liquid ejecting head can be improved.

5. Modification Example

The embodiments given as examples described above can be variously modified. Specific modified aspects that may be applied to the above-described embodiments are given as examples below. Two or more embodiments optionally selected from the following examples may be appropriately combined within a scope where the embodiments do not contradict each other.

5-1. Modification Example 1

In the above-described embodiments, the configuration in which the ink is circulated inside and outside the head chip is exemplified, but the configuration is not limited to this, and for example, a configuration in which the ink is circulated inside the head chip may be used. In addition, a configuration for circulating ink is adopted as needed and is not essential.

5-2. Modification Example 2

The above-described embodiments exemplify a configuration using different types of first ink and second ink.

However, the configuration is not limited to this, and the number of types of ink used in the liquid ejecting head 150 may be 1 or may be equal to or greater than 3.

5-3. Modification Example 3

The form of each section of the ink flow path in the liquid ejecting head 150 is not limited to the above-mentioned form, and may be appropriately changed depending on, for example, disposition of the head chip 10. The holder 153 of each section constituting the flow path and the flow path structure 151 may be integrally configured.

5-4. Modification Example 4

The liquid ejecting apparatus 100 exemplified in each of the above-described embodiments can be adopted in various devices such as a facsimile machine and a copier, in addition to an apparatus dedicated to printing. However, the application of the liquid ejecting apparatus of the present disclosure is not limited to printing. For example, a liquid ejecting apparatus that ejects a solution of a coloring material is used as a manufacturing device for forming a color filter of a liquid crystal display device. Further, a liquid ejecting apparatus that ejects a solution of a conductive material is used as a manufacturing device for forming wiring or electrodes on a wiring substrate.

What is claimed is:

1. A liquid ejecting head comprising:

a pressure chamber substrate having a pressure chamber for accommodating a liquid;

a drive element that imparts a pressure fluctuation to the liquid in the pressure chamber;

a communication substrate having a supply communication flow path communicating with the pressure chamber and a nozzle communication flow path communicating with the pressure chamber and communicating with a nozzle for ejecting a liquid at a position different from the supply communication flow path; and a coupling substrate disposed between the pressure chamber substrate and the communication substrate, the coupling substrate having a supply port located between the pressure chamber and the supply communication flow path and a discharge port located between the pressure chamber and the nozzle communication flow path, wherein a flow path cross-sectional area of the supply port is smaller than a flow path cross-sectional area of the supply communication flow path, the coupling substrate is made of a photosensitive resist film, the supply port includes a first portion that does not overlap the supply communication flow path but overlaps the pressure chamber when viewed in a thickness direction of the pressure chamber substrate, a second portion that does not overlap the pressure chamber but overlaps the supply communication flow path when viewed in the thickness direction of the pressure chamber substrate, and a third portion that is located between the first portion and the second portion and does not overlap both the pressure chamber and the supply communication flow path when viewed in the thickness direction of the pressure chamber substrate.

2. The liquid ejecting head according to claim 1, wherein a thickness of the coupling substrate is thinner than a thickness of the pressure chamber substrate.

3. The liquid ejecting head according to claim 2, wherein a thickness of the coupling substrate is thinner than a thickness of the communication substrate.

4. The liquid ejecting head according to claim 3, wherein the coupling substrate has a first surface and a second surface facing a direction opposite to the first surface, and a region of the first surface not bonded to the pressure chamber substrate and a region of the second surface not bonded to the communication substrate do not overlap each other when viewed in a thickness direction of the pressure chamber substrate.

5. The liquid ejecting head according to claim 1, wherein the pressure chamber substrate and the coupling substrate are bonded to each other without using a coating type adhesive.

6. The liquid ejecting head according to claim 1, wherein the communication substrate and the coupling substrate are bonded to each other without using a coating type adhesive.

7. The liquid ejecting head according to claim 1, wherein the photosensitive resist film is made of an epoxy-based resin.

8. A liquid ejecting apparatus comprising:

the liquid ejecting head according to claim 1; and a liquid container storing a liquid supplied to the liquid ejecting head.

9. A liquid ejecting head comprising:

a pressure chamber substrate having a pressure chamber for accommodating a liquid;

a drive element that imparts a pressure fluctuation to the liquid in the pressure chamber;

a communication substrate having a supply communication flow path communicating with the pressure chamber and a nozzle communication flow path communicating with the pressure chamber and communicating with a nozzle for ejecting a liquid at a position different from the supply communication flow path; and a coupling substrate disposed between the pressure chamber substrate and the communication substrate, the coupling substrate having a supply port located between the pressure chamber and the supply communication flow path and a discharge port located between the pressure chamber and the nozzle communication flow path, the coupling substrate providing a bonding force between the coupling substrate and the pressure chamber substrate and a bonding force between the coupling substrate and the communication substrate such that an adhesive is not needed between the coupling substrate and the pressure chamber substrate and between the coupling substrate and the communication substrate, wherein a flow path cross-sectional area of the supply port is smaller than a flow path cross-sectional area of the supply communication flow path, and the coupling substrate is made of a photosensitive resist film.

10. The liquid ejecting head according to claim 9, wherein a thickness of the coupling substrate is thinner than a thickness of the pressure chamber substrate.

11. The liquid ejecting head according to claim 10, wherein a thickness of the coupling substrate is thinner than a thickness of the communication substrate.

12. The liquid ejecting head according to claim 11, wherein the coupling substrate has a first surface and a second surface facing a direction opposite to the first surface, and a region of the first surface not bonded to the pressure chamber substrate and a region of the second surface not bonded to the communication substrate do not overlap each other when viewed in a thickness direction of the pressure chamber substrate.

13. The liquid ejecting head according to claim 11, wherein the supply port includes a first portion that does not overlap the supply communication flow path but overlaps the pressure chamber when viewed in a thickness direction of the pressure chamber substrate, a second portion that does not overlap the pressure chamber but overlaps the supply communication flow path when viewed in the thickness direction of the pressure chamber substrate, and a third portion that is located between the first portion and the second portion and does not overlap both the pressure chamber and the supply communication flow path when viewed in the thickness direction of the pressure chamber substrate.

14. The liquid ejecting head according to claim 9, wherein the photosensitive resist film is made of an epoxy-based resin.

15. A liquid ejecting apparatus comprising:

the liquid ejecting head according to claim 9; and a liquid container storing a liquid supplied to the liquid ejecting head.

* * * * *